(12) United States Patent
Fu

(10) Patent No.: US 10,262,658 B2
(45) Date of Patent: Apr. 16, 2019

(54) VOICE RECOGNITION METHOD AND SYSTEM

(71) Applicant: SHENZHEN SKYWORTH-RGB ELECTRONIC CO., LTD., Shenzhen, Guangdong (CN)

(72) Inventor: Chunyuan Fu, Shenzhen (CN)

(73) Assignee: SHENZHEN SKYWORTH-RGB ELETRONIC CO., LTD., Shenzhen (CN)

( * ) Notice: Subject to any disclaimer, the term of this patent is extended or adjusted under 35 U.S.C. 154(b) by 127 days.

(21) Appl. No.: 15/127,790

(22) PCT Filed: Dec. 23, 2014

(86) PCT No.: PCT/CN2014/094624
§ 371 (c)(1),
(2) Date: Sep. 20, 2016

(87) PCT Pub. No.: WO2016/082267
PCT Pub. Date: Jun. 2, 2016

(65) Prior Publication Data
US 2017/0098447 A1    Apr. 6, 2017

(30) Foreign Application Priority Data
Nov. 28, 2014 (CN) .......................... 2014 1 0714386

(51) Int. Cl.
*G10L 15/00* (2013.01)
*G10L 15/26* (2006.01)
(Continued)

(52) U.S. Cl.
CPC .......... *G10L 15/25* (2013.01); *G06K 9/00335* (2013.01); *G06K 9/6293* (2013.01);
(Continued)

(58) Field of Classification Search
CPC .......... G10L 15/24; G10L 15/25; G10L 15/32
See application file for complete search history.

(56) References Cited

U.S. PATENT DOCUMENTS

| 6,633,844 | B1 | 10/2003 | Verma et al. |
| 7,165,029 | B2 * | 1/2007 | Nefian .................... G10L 15/25 704/236 |

(Continued)

FOREIGN PATENT DOCUMENTS

| CN | 102023703 A | 4/2011 |
| CN | 103678271 A | 3/2014 |
| JP | 2002304194 A | 10/2002 |

OTHER PUBLICATIONS

1st Office Action of counterpart Chinese Patent Application No. 201410714386.2 dated Feb. 20, 2017.
(Continued)

*Primary Examiner* — Richard Z Zhu

(57) ABSTRACT

The present disclosure provides a voice recognition method, when receiving a voice signal, an image acquisition device is controlled to acquire images, and when the voice signal being over, the image acquisition device is controlled to stop acquiring the image; the received voice signal is recognized to obtain a voice signal recognition result; accuracies of the voice signal recognition result and the lip-reading recognition result is calculated, the recognition result with a higher accuracy is taken as a current voice recognition result. The present disclosure also provides a voice recognition system. The present disclosure improves the accuracy of the voice recognition.

10 Claims, 10 Drawing Sheets

(51) Int. Cl.
- *G10L 15/25* (2013.01)
- *G06K 9/00* (2006.01)
- *G10L 15/08* (2006.01)
- *G10L 25/51* (2013.01)
- *G06K 9/62* (2006.01)
- *G10L 15/32* (2013.01)
- *G10L 15/24* (2013.01)

(52) U.S. Cl.
CPC .............. *G10L 15/08* (2013.01); *G10L 15/26* (2013.01); *G10L 25/51* (2013.01); *G10L 15/24* (2013.01); *G10L 15/32* (2013.01); *G10L 2015/088* (2013.01)

(56) References Cited

U.S. PATENT DOCUMENTS

| | | | | |
|---|---|---|---|---|
| 9,854,139 | B2* | 12/2017 | Thorn | H04N 5/2251 |
| 2002/0116197 | A1* | 8/2002 | Erten | G06K 9/6292 |
| | | | | 704/273 |
| 2003/0018475 | A1* | 1/2003 | Basu | G06K 9/00228 |
| | | | | 704/270 |
| 2003/0171932 | A1* | 9/2003 | Juang | G10L 15/24 |
| | | | | 704/276 |
| 2005/0267871 | A1* | 12/2005 | Marchisio | G06F 17/30672 |
| 2008/0162137 | A1* | 7/2008 | Saitoh | G10L 15/22 |
| | | | | 704/251 |
| 2010/0063820 | A1* | 3/2010 | Seshadri | G10L 15/25 |
| | | | | 704/251 |
| 2011/0071830 | A1* | 3/2011 | Kim | G01C 21/3602 |
| | | | | 704/246 |
| 2013/0054240 | A1 | 2/2013 | Jang et al. | |
| 2014/0214424 | A1* | 7/2014 | Wang | G06K 9/00288 |
| | | | | 704/246 |
| 2015/0325240 | A1* | 11/2015 | Li | G06K 9/00335 |
| | | | | 704/231 |
| 2016/0180742 | A1* | 6/2016 | Lee | G06F 17/274 |
| | | | | 704/9 |

OTHER PUBLICATIONS

Liangmin Wang et al., Research and Implementation of a Real-time Approach to Lip Detection in Video Sequences, Computer Applications, Jan. 28, 2004, pp. 70-71, vol. 24, No. 1.

Lixia Long et al., An Example-Context-Based Approach for Speech Recognition Error Detection and Correction, Advances of Computational Linguistics in China, Jul. 31, 2009, pp. 648-653, published by Tsinghua University Press.

International Search Report of PCT Patent Application No. PCT/CN2014/094624 dated Sep. 9, 2015.

* cited by examiner

VOICE RECOGNITION METHOD AND SYSTEM

FIELD OF THE DISCLOSURE

The present disclosure relates to the field of voice control, and in particular, to voice recognition method and system.

BACKGROUND OF THE DISCLOSURE

With the development of voice interaction, controlling a terminal (such as a television and an air conditioner, and so on) by voice, or inputting data through voice has already been widely used. Currently, there are many problems in the voice interaction, such as, the voice recognition is not accurate, and is easily influenced by the environment, for example, if there exists noisy or background music, a voice signal acquired by a voice acquisition device includes a voice signal sent out by human and a surrounding noise signal, which causes that the terminal cannot accurately recognize the received voice signal, and the voice recognition is not accurate enough.

SUMMARY OF THE DISCLOSURE

The present includes disclosure is to provide a voice recognition method and system, which aims to solve the problem of that the voice recognition is not accurate enough.

In order to achieve the above aim, the present disclosure provides a voice recognition method, the voice recognition method includes the following steps:
  when receiving a voice signal, an image acquisition device is controlled to acquire images, and when the voice signal being over, the image acquisition device is controlled to stop acquiring the image;
  the received voice signal is recognized to obtain a voice signal recognition result;
  an image having the lip included in the acquired images is to be lip-reading recognized to acquire a lip-reading recognition result; and
  accuracies of the voice signal recognition result and the lip-reading recognition result are calculated, the recognition result with a higher accuracy is taken as a current voice recognition result.

Preferably, recognizing the lip-reading of the image having the lip included in the acquired images to acquire the lip-reading recognition result comprises the following steps:
  the image having the lip included in the acquired images is confirmed; the image including the lip is regarded as a valid image, and a position of the lip in the valid image is confirmed;
  characters outputted by a user is confirmed according to a lip's shape of each frame valid image and a lip's shape of a previous frame valid image; and
  the characters corresponding to each frame valid image form the lip-reading recognition result.

Preferably, confirming the acquired image having the lip included in the acquired image, regarding the image including the lip as the valid image, and confirming the position of the lip in the valid image includes the following steps:
  a face included in each acquired frame image is confirmed;
  a chromatic value of each pixel in the face is compared with a prestored chromatic value of each pixel in the face, to confirm a position of the face in each acquired frame image;
  eyes position in the face position is confirmed, and a lip area is confirmed based on a relative position between the eyes position and the face position;
  RGB chromatic values of each pixels in the lip area are compared;
  when one RGB chromatic value existed in the lip area meets a preset condition of the pixel, the frame image is confirmed as the image including the lip, and the image including the lip is regarded as the valid image; and
  the position of the lip is confirmed based on the RGB chromatic values in the lip area.

Preferably, recognizing the received voice signal to obtain the voice signal recognition result includes the following steps:
  the received voice signal is converted to a character string, the character string is split into a plurality of key words according to a preset key words database;
  a part of speech of each key word is marked, whether the parts of speech of every two adjacent key words are matched is confirmed;
  when the parts of speech of two adjacent key words are not matched, the non-matching key words are regarded as first key words, and whether there exists the first key words in a preset confusable words database is confirmed;
  when there exists the non-matching key words in a preset confusable words database, second key words in the confusable words database corresponding to the first key words are confirmed;
  the first key words are replaced with the second key words, when the parts of speech of the replacing second key words match with the parts of speech of key words adjacent to the replacing second key words, the replacing second key words and other key words cooperatively form the voice signal recognition result, and the reformed lip-reading recognition result is regarded as the current voice recognition result.

Preferably, recognizing the received voice signal to obtain the voice signal recognition result also includes the following steps: when the part of speech of the replacing second key word do not match adjacent key words, a number the second key word is multiple, the first key words are replaced with the second key words, and whether the replacing second key words match with adjacent key words are confirmed, until all the second key words are replaced, the converted character string is regarded as the current voice recognition result.

Preferably, calculating accuracies of the voice signal recognition result and the lip-reading recognition result, and taking the recognition result with a higher accuracy as a current voice recognition result includes the following steps:
  the voice signal recognition result and the lip-reading recognition result are split into a plurality of key words;
  a first association degree of every two adjacent key words among the split key words according to the voice signal recognition result is confirmed, and a second association degree of every two adjacent key words among the split key words according to the lip-reading recognition result is confirmed;
  the confirmed first association degree are summed to obtain the accuracy of the voice signal recognition result, and the confirmed second association degree are summed to obtain the accuracy of the voice signal recognition result;
  the recognition result with a higher accuracy is regarded as the current voice recognition result.

In addition, in order to achieve the above aim, the present disclosure also provides a voice recognition system, the voice recognition system includes:

a control module, when receiving a voice signal, the control module is used for controlling an image acquisition device to acquire images, and when the voice signal is over, the image acquisition device is controlled to stop acquiring the image;

a voice signal recognition module, the voice signal recognition module is used for recognizing the received voice signal to obtain a voice signal recognition result;

a lip-reading recognition module, the lip-reading recognition module is used for recognizing an image having the lip included in the acquired images to obtain a lip-reading recognition result;

a processing module, the processing module is used for calculating accuracies of the voice signal recognition result and the lip-reading recognition result, taking the recognition result with a higher accuracy as a current voice recognition result.

Preferably, the lip recognition module includes:

a lip locating submodule, the lip locating submodule is used for confirming that the acquired image includes the image having the lip, regarding the image having the lip as a valid image, and confirming a lip position included in the valid image;

a confirming submodule, the confirming submodule is used for confirming characters outputted by a user according to a lip's shape of each frame valid image and a lip's shape of a previous frame valid image.

a reforming submodule, the reforming submodule is used for form the lip-reading recognition result based on the characters corresponding to each frame valid image.

Preferably, the lip locating submodule includes:

a face confirming unit, the face confirming unit is used for confirming the face in each acquired frame image;

a face position locating unit, the face position locating unit is used for comparing a chromatic value of each pixel in the face with a prestored chromatic value of each pixel in the face, to confirm a position of the face in each acquired frame image;

a lip area locating unit, the lip area locating unit is used for confirming eyes position in the face position, and confirming a lip area based on a relative position between the eyes position and the face position;

a comparing unit, the comparing unit is used for comparing RGB chromatic values in the lip area;

a processing unit, when one RGB chromatic value existed in the lip area meets a preset condition of the pixel, the processing unit is used for confirming that the frame image includes the image having the lip, and the image having the lip is regarded as the valid image;

a lip position locating unit, the lip position locating unit is used for confirming a position of the lip based on the RGB chromatic values in the lip area.

Preferably, the voice signal recognition module includes:

a converting submodule, the converting submodule is used for converting the received voice signal to a character string;

a splitting submodule, the splitting submodule is used for splitting the character string into a plurality of key words according to a preset key words database;

a part-of-speech matching submodule, the part-of-speech matching submodule is used for marking a part of speech of each key word, confirming whether the parts of speech of every two adjacent key words are matched;

a confirming submodule, when the parts of speech of two adjacent key words are not matched, the confirming submodule is used for confirming that the non-matching key words are regarded as first key words, and when the parts of speech of two adjacent key words are not matched, the confirming submodule is used for confirming second key words in a preset confusable words database corresponding to the first key words;

a processing submodule, the processing submodule is used for replacing the first key words with the second key words, when the parts of speech of the replacing second key words match with the parts of speech of adjacent key words, the processing submodule combines the replacing second key words and other key words to form the voice signal recognition result, and takes the reformed lip-reading recognition result as the current voice recognition result.

Preferably, the processing submodule includes: when the part of speech of the replacing second key word do not match adjacent key words, a number of the second key word is multiple, the first key words are replaced with the second key words, and whether the replacing second key words match with adjacent key words are confirmed, until all the second key words are replaced, the converted character string is regarded as the current voice recognition result.

Preferably, the processing module includes:

a splitting submodule, the splitting submodule is used for splitting the voice signal recognition result and the lip-reading recognition result into a plurality of key words;

an association degree calculating submodule, the association degree calculating submodule is used for confirming a first association degree of every two adjacent key words among the split key words according to the voice signal recognition result, and confirming a second association degree of every two adjacent key words among the split key words according to the lip-reading recognition result;

an accuracy calculating submodule, the accuracy calculating submodule is used for summing the confirmed first association degree to obtain the accuracy of the voice signal recognition result, and summing the confirmed second association degree to obtain the accuracy of the voice signal recognition result;

a processing submodule, the processing submodule is used for taking the recognition result with a higher accuracy as the current voice recognition result.

The voice recognition method and system provided by the present disclosure, can recognize the voice signal and the lip-reading simultaneously, and calculate accuracies of the voice signal recognition result and the lip-reading recognition result, takes the recognition result with a higher accuracy as the current voice recognition result, instead of just recognizing the voice signal, so that the accuracy of the voice recognition is improved.

The realizing of the aim, functional characteristics, advantages of the present disclosure are further described in detail with reference to the accompanying drawings and the embodiments.

DETAILED DESCRIPTION OF THE EMBODIMENTS

It is to be understood that, the described embodiments are only some exemplary embodiments of the present disclosure, and the present disclosure is not limited to such embodiments.

The present disclosure provides a voice recognition method.

Figure 1:
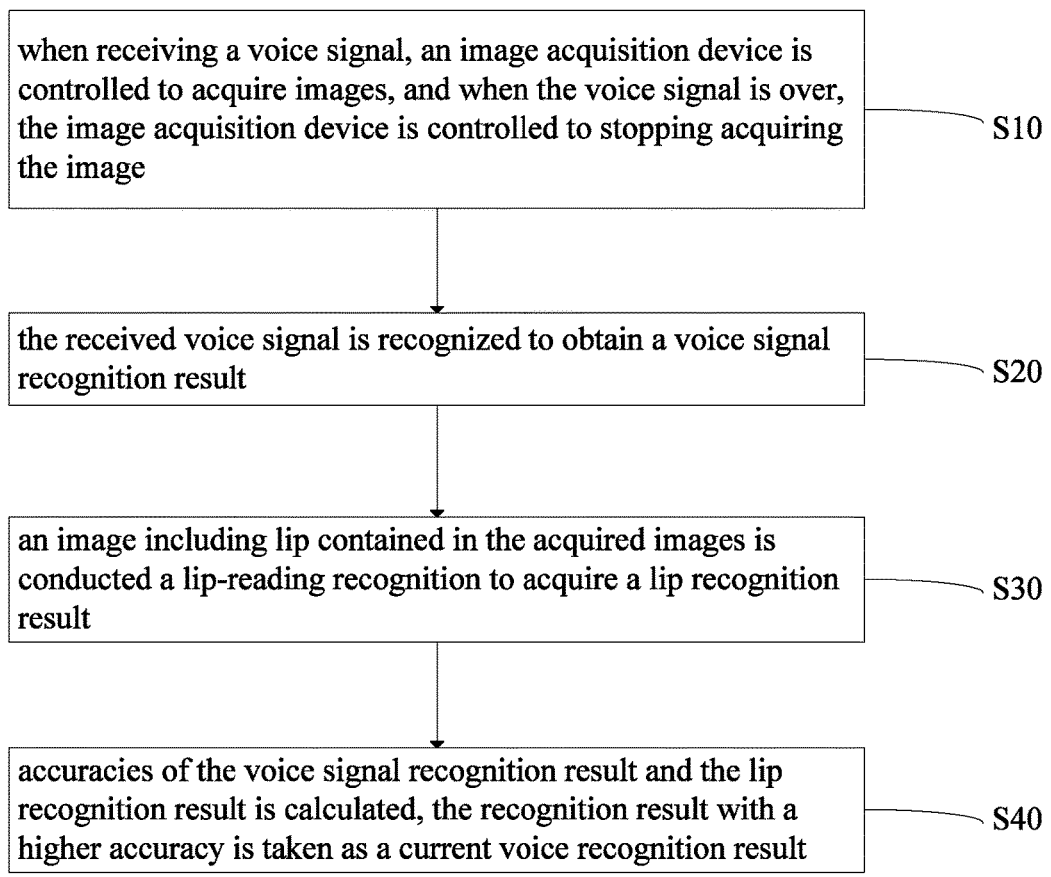
FIG. 1 is a flow diagram of the voice recognition method provided by a preferable exemplary embodiment of the present disclosure.

Referring to FIG. 1, FIG. 1 is a flow diagram of the voice recognition method provided by a preferable exemplary embodiment of the present disclosure.

The voice recognition method of the exemplary embodiment is preferably run on a controlled terminal (such as a television and an air conditioner, and so on), the controlled terminal operates by receiving the voice recognition; or the voice recognition can be run on a controlling terminal, the controlling terminal can transmit a code corresponding to voice signal recognition result to corresponding controlled terminal.

The exemplary embodiment provides a voice recognition method, which includes:

Step S10, when receiving a voice signal, an image acquisition device is controlled to acquire images, and when the voice signal being over, the image acquisition device is controlled to stop acquiring the image;

In the exemplary embodiment, the image acquisition device is controlled to acquire the image only when receiving the voice signal, while when the voice signal is not received, the image acquisition device remains dormant to save energy, such as, the image acquisition device is controlled to remain dormant when the voice signal is not received in a preset time interval.

It is to be understood by the ordinary skill in the art, the image acquisition device can be controlled to acquired the image in real time or regularly.

Figure 2:
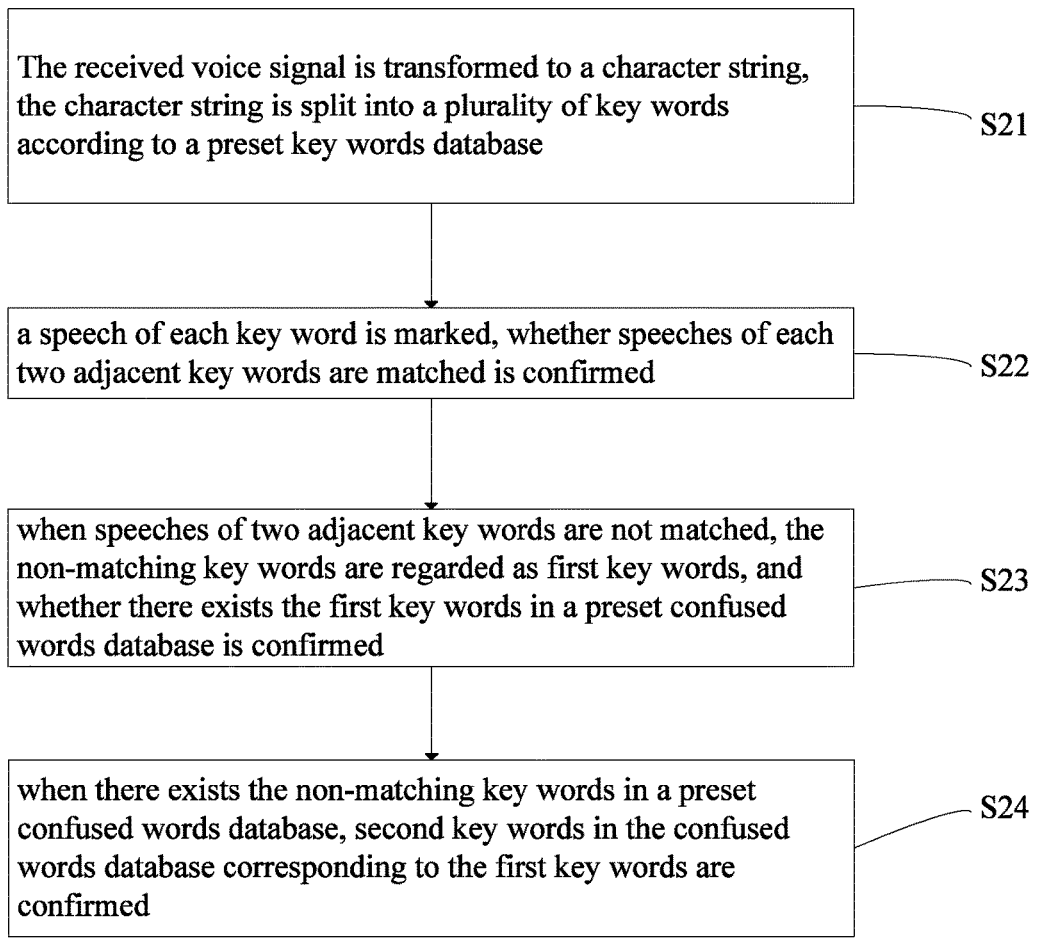
FIG. 2 is a refining flow diagram of step 20 shown in FIG. 1.

Step S20, the received voice signal is recognized to obtain a voice signal recognition result;

In the exemplary embodiment, the voice signal can be converted to a character signal to obtain the voice signal recognition result. Furthermore, in order to improve the accuracy of the voice signal recognition result, the character signal converted by the voice signal can be corrected, the detail correction step refers to FIG. 2, the step S20 includes:

Step S21, the received voice signal is converted to a character string, and the character string is split to a plurality of key words according to a preset key words database;

The preset key words database can be preset to have a plurality of key words, the character string converted by the voice signal can be compared with the stored key words in the database, and key words in the preset key words database matching with the character string are confirmed, and the character string is split into a plurality of matched key words. It is to be understood by the ordinary skill in that art, the key words database may not have numbers, after the key words matched with the character string are confirmed, the key words matched with the character string can be retrieved first, and remaining non-matched part in the character string can be regarded as a key word. Such as, the voice signal can be converted to a character string "television, switch to channel 23", this character string can be matched with the key words "television, switch, to and channel" included in the preset key words database, and the "television, switch, to and channel" are retrieved from the character string, and the remaining "23" is regarded as a key word.

Step S22, a part of speech of each key word is marked, whether the parts of speech of every two adjacent key words are matched is confirmed;

The parts of speech of the key words can be noun, verb, adjective, preposition, and so on, the matching of various parts of speech can be preset, such as, when two adjacent key words are verb and adjective, it maintain that the parts of speech of the two adjacent key words are not matched, there may be existed a recognition error.

Step S23, when the parts of speech of the two adjacent key words are not matched, the non-matched key words can be regarded as a first key word, and whether there exists the first key word in a preset confusable words database is confirmed;

Step S24, when there exists non-matched key words in the confusable words database, second key words in the confusable words database corresponding to the first key words are confirmed;

In the exemplary embodiment, the confusable words database can be preset, the confusable words database can preset confusable words when the voice signal is converted into the character string, confusable words are stored keep in touch. When two adjacent key words are not matched, the non-matching key words are regarded as first key words, and the first key words are compared with the key words in the confusable words database to correct the wrong key words.

It is to be understood by the ordinary skill in the art, when there exists non-matching key words in the confusable words database, the converted character string can be regarded as the current voice signal recognition result.

Step S25, the first key words are replaced with the second key words, when the parts of speech of the replacing second key words are matched with the parts of speech of key words adjacent to the replacing second key words, the replacing second key words and other key words cooperatively reform the voice signal recognition result, and the reformed lip-reading recognition result is regarded as the current voice recognition result.

It is to be understood by the ordinary skill in the art, when the parts of speech of the replacing second key words are not matched with the parts of speech of key words adjacent to the replacing second key words, and there are a plurality of second key words, the first key words are replaced with the other second key words, and whether the parts of speech of the replacing second key words are matched with the parts of speech of key words adjacent to the replacing second key words, until all the second keys words are replaced, the converted character string is regarded as the current voice signal recognition result.

Figure 3:
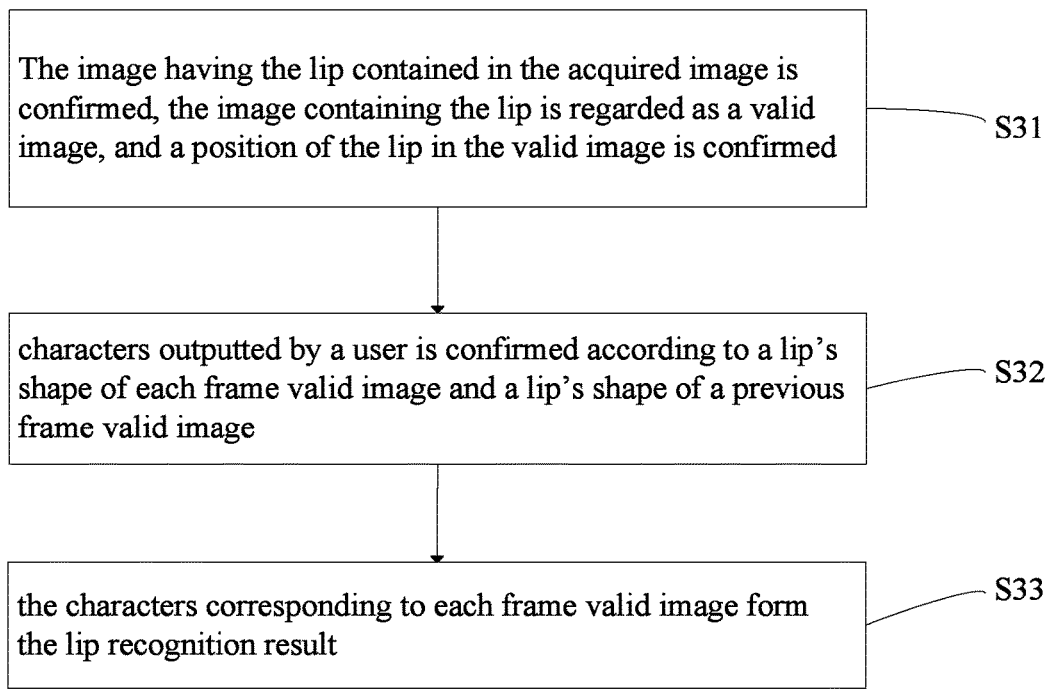
FIG. 3 is a refining flow diagram of step 30 shown in FIG. 1.
Figure 4:
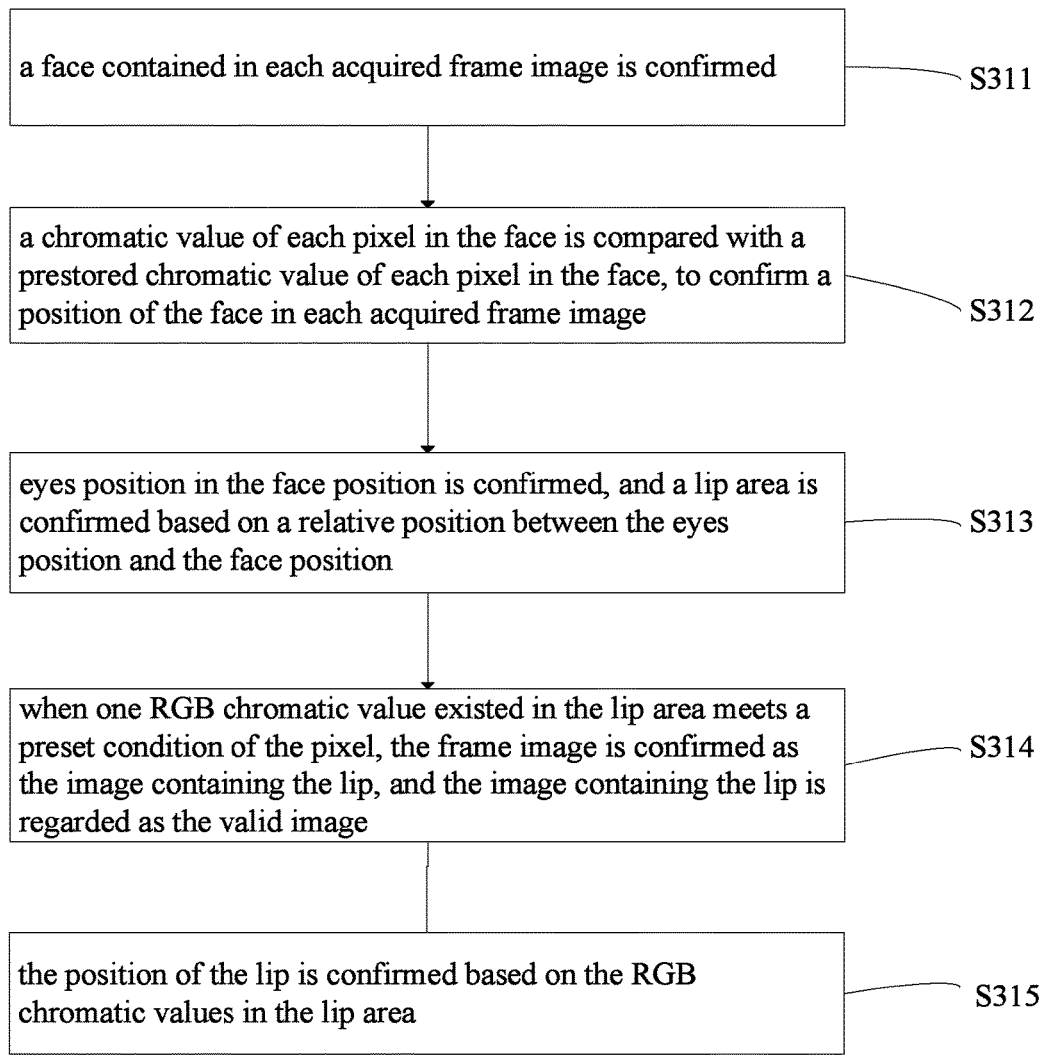
FIG. 4 is a refining flow diagram of step 31 shown in FIG. 3.

Step S30, the image having the lip included in the acquired image is recognized to acquire a lip-reading recognition result;

In the exemplary embodiment, the lip-reading recognition result can be got by a lip's shape of each frame valid image and a lip's shape of a previous frame valid image, the detail process can be referred to FIG. 3, the step S30 includes:

Step S31, the image having the lip included in the acquired image is confirmed, the image including the image having the lip is regarded as the valid image, and the position of the lip in the valid image is confirmed;

In the exemplary embodiment, referring to FIG. 4, confirming the position of the lip in the valid image includes the following steps:

Step S311, a face included in each acquired frame image is confirmed; as chromatic values corresponding to pixels in the acquired image are different, a position of the face in each acquired frame image can be confirmed according to a distribution of the chromatic values of the pixels and a preset face.

It is to be understood by the ordinary skill in the art, when an acquisition area of the image acquisition device has a plurality of humans, a direction of sound source can be located based on the received voice signal, positions of the humans in the acquired image can be located based on the confirmed direction of the voice source, the confirming of the locating of the humans in the acquired image based on the direction of the voice source belongs to a current technology, no need to repeat again.

When there does not exist face in the acquired image, the voice recognition result corresponding to the voice signal can be regarded as the current voice recognition result directly, or when there does not exist face in the acquired image, the voice signal recognition result corresponding to the voice signal can be directly regarded as the current voice signal recognition result, or the user may be noticed to input the voice signal again.

Step S312, a chromatic value of each pixel in the face is compared with a prestored chromatic value of each pixel in the face, to confirm a position of the face in each acquired frame image;

A similar degree between each YUV chromatic value of each pixel in the face and the prestored YUV chromatic value of each pixel in the face is confirmed, when the similar degree is large than a preset value, the pixel can be regarded as the pixel of the face, a calculating formula belongs to a current technology, and no need to repeat again.

Step S313, eyes position in the face position is confirmed, and a lip area is confirmed based on a relative position between the eyes position and the face position;

In the exemplary embodiment, as a gray value of the pixel of the eyes is smaller than gray values of other pixels of the face, the eyes position can be confirmed according to the gray value between every two pixel, so that the lip area can be easily confirmed, and the lip area is below the eyes position and located at ⅓ down the face.

Step S314, when one RGB (Red, Green, Blue) chromatic value existed in the lip area meets a preset condition of the pixel, the frame image is confirmed as the image including the lip, and the image including the lip is regarded as the valid image;

Step S315, the position of the lip is confirmed based on the RGB chromatic values in the lip area.

But due to the current confirmed lip area is only a preliminary confirmation, the area has pixels of the lip and pixels of the face, the lip position in the area should be confirmed. As in the RCB chromatic value in the lip pixels, B (blue) component is much larger than G (green) component, a preset condition can be set that a difference between the B (blue) component and the G (green) component is larger than the preset value, while the B (blue) component is smaller than the G (green) component in the pixels of the face, and the lip position can be confirmed through the comparing B component of each pixel with G component of each pixel.

Step S32, characters outputted by a user is confirmed according to a lip's shape of each frame valid image and a lip's shape of a previous frame valid image;

Step S33, the characters corresponding to each frame valid image form the lip-reading recognition result.

It is to be understood by the ordinary skill in the art, the lip's shape of the previous frame image before the first frame image of the acquired images defaults to a shut up shape, the user can get a tendency of the lip based on the previous frame image and the lip's shape corresponding to the previous frame image, the tendency of the lip can be compared with the prestored tendency of the lip, to get the current outputted characters. According to the acquisition order of the frame images, the frame images form the lip-reading recognition result.

Step S40, accuracies of the voice signal recognition result and the lip-reading recognition result is calculated, the recognition result with a higher accuracy is taken as a current voice recognition result.

Figure 5:
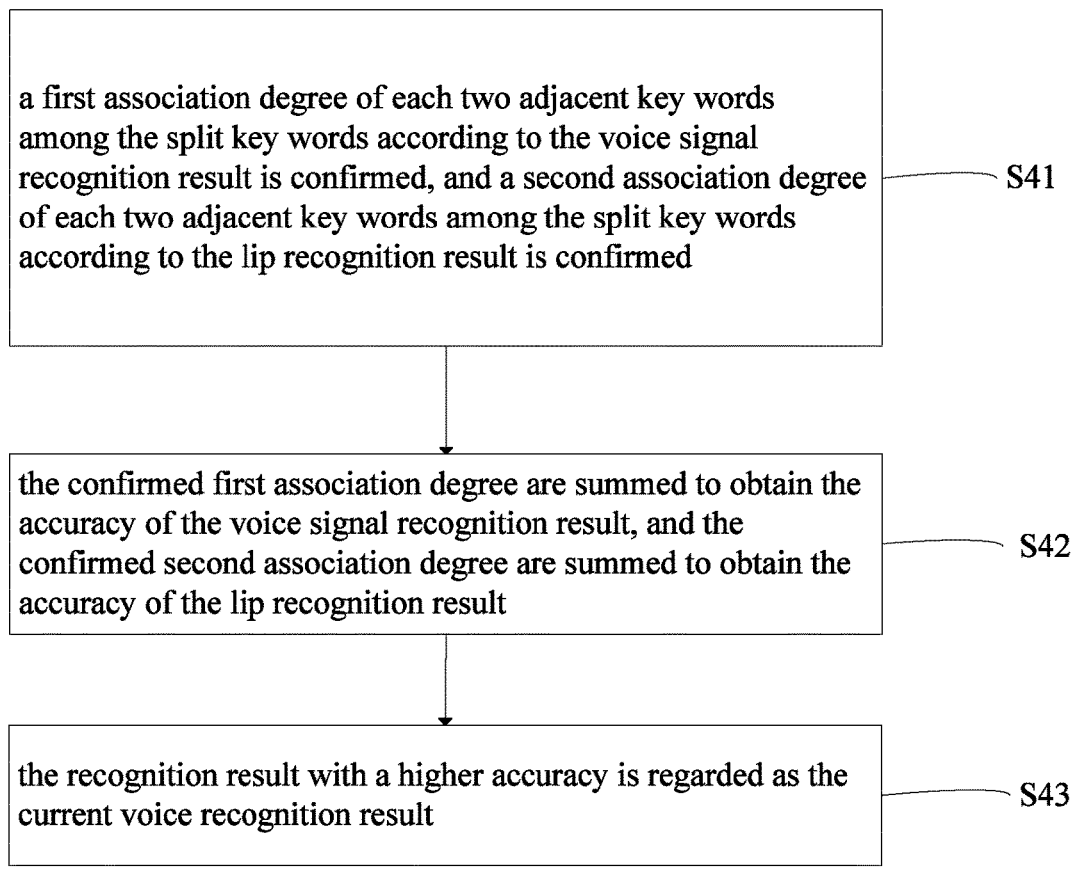
FIG. 5 is a refining flow diagram of step 40 shown in FIG. 1.

In the exemplary embodiment, the detail process of calculating accuracies of the voice signal recognition result and the lip-reading recognition result is shown as FIG. 5, the detail process includes:

Step S41, the voice signal recognition result and the lip-reading recognition result are split into a plurality of key words;

The process of splitting the key words is same with the splitting the key words of the voice signal, no need to repeat again.

Step S42, a first association degree of every two adjacent key words among the key words split from the voice signal recognition result is confirmed, and a second association degree of every two adjacent key words among the key words split from the voice signal recognition result is confirmed;

In the exemplary embodiment, a calculating formula of the first association degree can be:

$$I(x, y) = \frac{\log_2 p(x, y)}{p(x) \times p(y)},$$

p(x) can be a number of key word x appeared in the character string in two adjacent key words x, y, p(y) can be a number of key word y appeared in the character string in two adjacent key words x, y, p(x, y) can be a number of adjacent key words x, y appeared in the character string at the same time. A calculating formula of the second association degree is same with the calculating formula of the first association degree, no need to repeat again.

Step S43, the confirmed first association degrees are summed to get the accuracy of the voice signal recognition result, and the second association degrees are summed to get the accuracy of the voice signal;

In the exemplary embodiment, the first association degree of every two adjacent key words in the character string is calculated to get a plurality of first association degrees, the calculated association degrees are summed to get the accuracy of the character string.

Step S44, the recognition result with a higher accuracy is regarded as the current voice recognition result.

The voice recognition method provided by the exemplary embodiment can recognize the voice signal and the lip-reading simultaneously, and the accuracies of the voice signal recognition result and the lip-reading recognition result, and the recognition result with a higher accuracy can be regarded as the current recognition result, and not just recognize the voice signal, such that the accuracy of the voice signal is improved.

The present disclosure further provides a voice recognition system.

Figure 6:
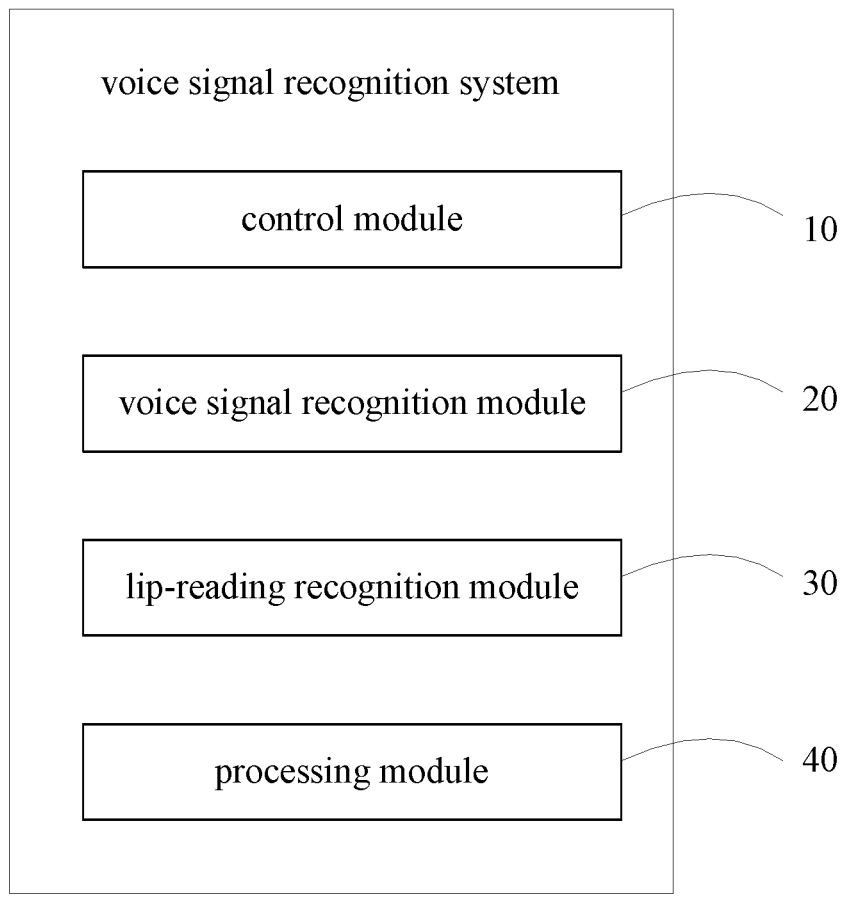
FIG. 6 is a function module diagram of the voice recognition system provided by a preferable exemplary embodiment of the present disclosure.

Referring to FIG. 6, FIG. 6 is a function module diagram of the voice recognition system provided by a preferable exemplary embodiment of the present disclosure.

It is to be understood that, for the ordinary skill in the art, the function module diagram of FIG. 6 is just a preferable exemplary embodiment diagram, the ordinary skill in the art can add new function modules easily according to the function module diagram of the voice recognition system of FIG. 6; the names of the function modules are custom names, and can only be used for understanding the program function modules of the voice recognition system, cannot be used for limiting the technical proposal of the present disclosure, the core the technical proposal of the present disclosure is the functions achieved by the custom named function modules.

The voice recognition system provided by the exemplary embodiment is preferably run on a controlled terminal (such as a television and an air conditioner, and so on), the controlled terminal operates by receiving the voice recognition; or the voice recognition system can be run on a control terminal, the control terminal can transmit the codes corresponding to the voice signal recognition result to the corresponding controlled terminal.

The exemplary embodiment provides a voice recognition system, the voice recognition system includes:

A control module 10, the control module 10 is used for controlling an image acquisition device to acquire images when receiving a voice signal, and controlling the image acquisition device stop acquiring the image when the voice signal being over.

In the exemplary embodiment, the control module 10 only controls the image acquisition device to acquire the images when receiving the voice signal, and remains dormant before receiving the voice signal, to save energy, such as, when the control module 10 has not received the voice signal in a preset time interval, the control module 10 controls the image acquisition device to stay dormant.

It is to be understood by the ordinary skill in the art, the control module 10 can control the image acquisition device the acquire image in real time or regularly, when the voice signal is received, a first time of receiving the voice signal and a second time of ending the voice signal are confirmed, the image acquisition device acquires images between the first time and the second time.

Figure 7:
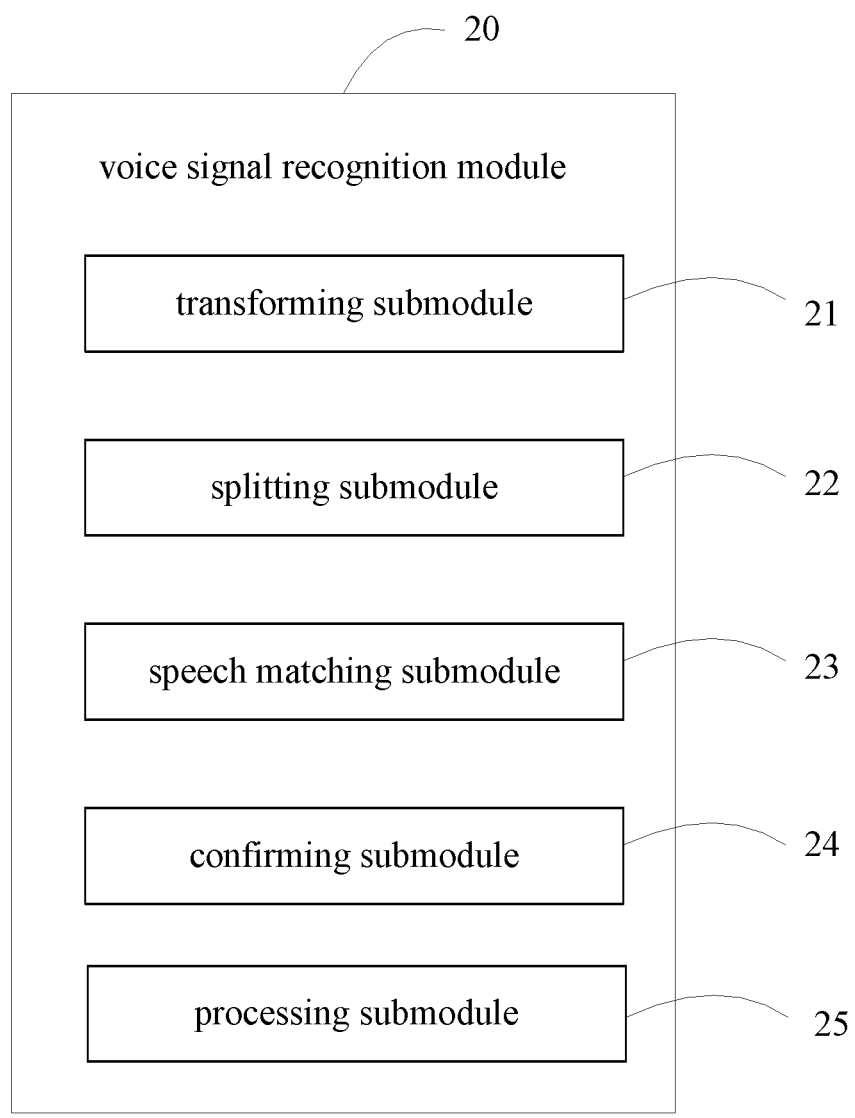
FIG. 7 is a refining function module diagram of voice signal recognition module shown in FIG. 6.

A voice signal recognition module, the voice signal recognition module is used for recognizing the received voice signal to obtain a voice signal recognition result;

In the exemplary embodiment, the voice signal recognition module 20 can obtain the voice signal recognition result by converting the voice signal to a character string. Furthermore, in order to improve the accuracy of the voice signal recognition result, the character string converted by the voice signal can be corrected, referring to FIG. 7, the voice signal recognition module 20 includes:

A converting submodule 21, the converting submodule 21 is used for converting the received voice signal to the character string;

A splitting submodule 22, the splitting submodule 22 is used for splitting the character string into a plurality of key words according to a preset key words database;

The key words database can be preset to have a plurality of key words, the splitting submodule 22 compares the character string converted by the voice signal with the stored key words in the database, and confirms key words in the preset key words database matching with the character string, and split the character string into a plurality of matched key words. It is to be understood by the ordinary skill in that art, the key words database may not have numbers, after the key words matched with the character string are confirmed, the key words matched with the character string can be retrieved first, and remaining non-matched part in the character string can be regarded as a key word. Such as, the voice signal can be converted to a character string "television, switch to channel 23", this character string can be matched with the key words "television, switch, to and channel" included in the preset key words database, and the "television, switch, to and channel" are retrieved from the character string, and the remaining "23" is regarded as a key word.

A part-of-speech matching submodule 23, the part-of-speech matching submodule 23 can be used for marking a part-of-speech of each key word, whether the parts of speech of every two adjacent key words are matched is confirmed;

The parts of speech of the key words can be noun, verb, adjective, preposition, and so on, the matching of various parts of speech can be preset, such as, when two adjacent key words are verb and adjective, the speech matching submodule 23 maintains that the parts of speech of the two adjacent key words are not matched, there may be existed a recognition error.

A confirming submodule 24, when the parts of speech of the two adjacent key words are not matched, the confirming submodule 24 takes the non-matched key words as first key words, and confirms whether there exists the first key word in a preset confusable words database;

In the exemplary embodiment, the confusable words database can be preset, the confusable words database can preset confusable words when the voice signal is converted into the character string, confusable words are stored keep in touch. When two adjacent key words are not matched, the non-matching key words are regarded as first key words, and the first key words are compared with the key words in the confusable words database to correct the wrong key words.

It is to be understood by the ordinary skill in the art, when there exists non-matching key words in the confusable words database, the converted character string can be regarded as the current voice signal recognition result.

A processing submodule 25, the processing submodule 25 can replace the first key words with the second key words, when the parts of speech of the replacing second key words match with the parts of speech of key words adjacent to the replacing second key words, the replacing second key words and other key words cooperatively reform the voice signal recognition result, and the reformed lip-reading recognition result is regarded as the current voice recognition result.

It is to be understood by the ordinary skill in the art, when the parts of speech of the replacing second key words are not matched with the parts of speech of key words adjacent to the replacing second key words, and there are a plurality of second key words, the processing submodule 25 can replace the first key words with the second key words, and confirm whether the parts of speech of the replacing second key words match with the parts of speech of key words adjacent to the replacing second key words, until all the second keys words are replaced, the processing submodule 25 takes the converted character string as the current voice signal recognition result.

Figure 8:
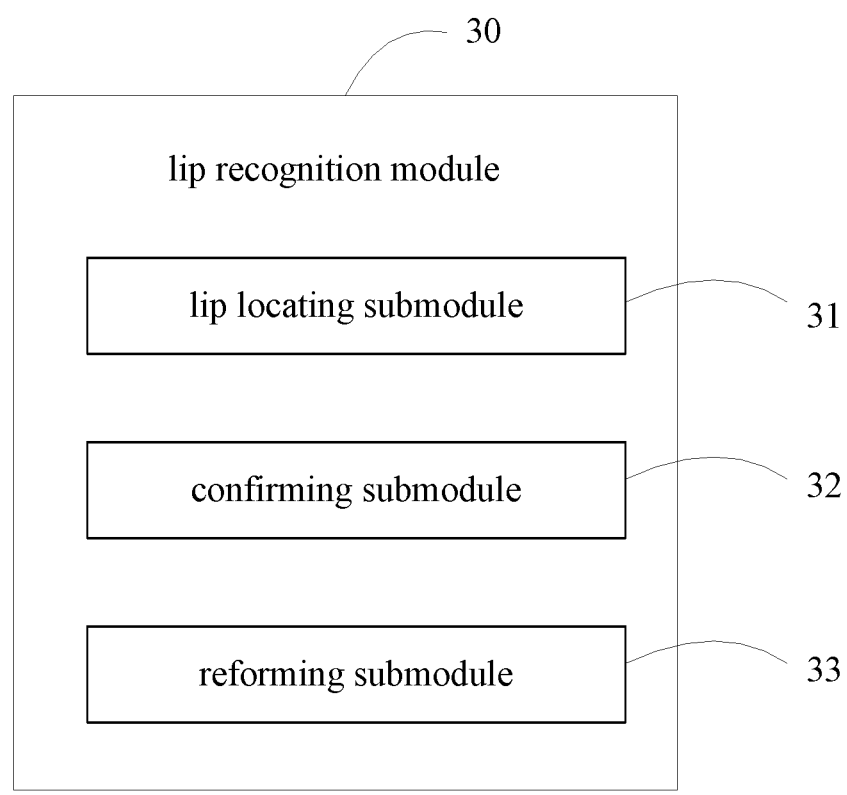
FIG. 8 is a refining function module diagram of lip recognition module shown in FIG. 6.
Figure 9:
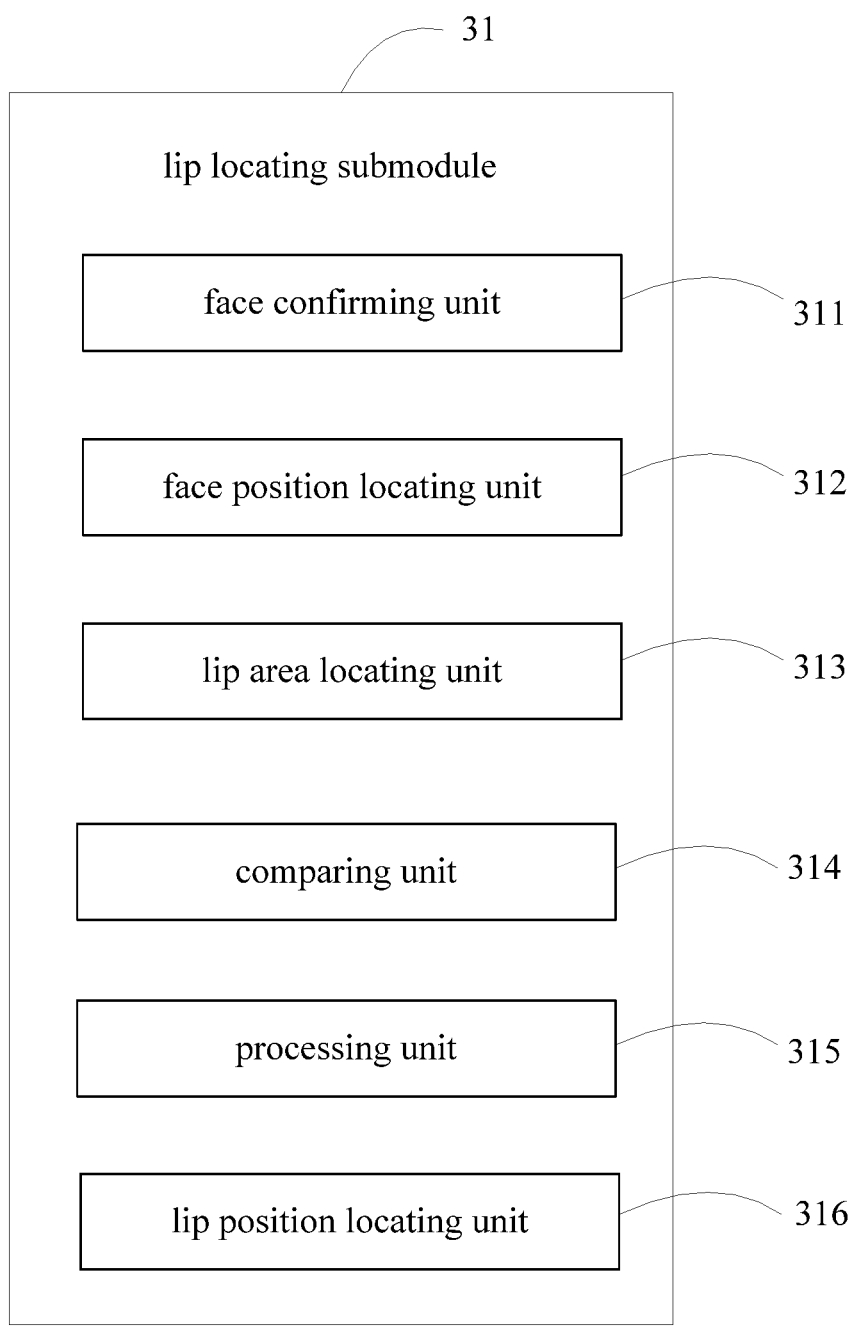
FIG. 9 is a refining function module diagram of lip locating submodule shown in FIG. 8.

A lip-reading recognition module 30, the lip-reading recognition module 30 can be used for recognizing an image having the lip contained in the acquired images to obtain a lip-reading recognition result;

In the exemplary embodiment, the lip-reading recognition result can be got by a lip's shape of each frame valid image and a lip's shape of a previous frame valid image, referring to FIG. 8, the lip-reading recognition module 30 includes:

A lip locating submodule 31, the lip locating submodule 31 is used for confirming that the acquired image contains the image having the lip, regarding the image having the lip as a valid image, and confirming a lip position contained in the valid image;

In the exemplary embodiment, the position of the lip in each frame image refers to FIG. 9, the lip locating submodule 31 includes:

A face confirming unit 311, the face confirming unit 311 is used for confirming the face in the each acquired frame image;

As chromatic values corresponding to pixels in the acquired image are different, the face confirming unit 311 can get a position of the face in each acquired frame image according to a distribution of the chromatic values of the pixels and a preset face.

It is to be understood by the ordinary skill in the art, when an acquisition area of the image acquisition device has a plurality of humans, the face confirming unit 311 can locate a direction of sound source based on the received voice signal, locate positions of the humans in the acquired image based on the confirmed direction of the voice source, the locating of the positions of the humans in the acquired images based on the direction of the voice source belongs to a current technology, no need to repeat again.

When there does not exist face in the acquired image, the processing module 40 directly takes the voice recognition result corresponding to the voice signal as the current voice recognition result, or notices the user to input voice signal again.

A face position locating unit 312, the face position locating unit 312 is used for comparing a chromatic value of each pixel in the face with a prestored chromatic value of each pixel in the face, to confirm a position of the face in each acquired frame image;

A similar degree between a YUV chromatic value of each pixel in the face and the prestored YUV chromatic value of each pixel in the face is confirmed, when the similar degree is large than a preset value, the pixel can be regarded as the pixel of the face, a calculating formula of the similar degree belongs to a current technology, and no need to repeat again.

In the exemplary embodiment, as a gray value of the pixel of the eyes is smaller than gray values of other pixels of the face, the eyes position can be confirmed according to the gray value between every two pixel, so that the lip area can be easily confirmed, and the lip area is below the eyes position and located at ⅓ down the face.

A comparing unit 314, the comparing unit 314 is used for comparing RGB chromatic values in the lip area;

A processing unit 315, the processing unit 315 can be used for confirming that the frame image includes the image having the lip, and taking the image having the lip as the valid image, when one RGB chromatic value existed in the lip area meets a preset condition of the pixel;

A lip position locating unit 316, the lip position locating unit 316 is used for confirming a position of the lip based on the RGB chromatic values in the lip area.

But due to the current confirmed lip area is only a preliminary confirmation, the area has pixels of the lip and pixels of the face, the lip position in the area should be confirmed. As in the RCB chromatic value in the lip pixels, B (blue) component is much larger than G (green) component, a preset condition can be set that a difference between the B (blue) component and the G (green) component is larger than the preset value, while the B (blue) component is smaller than the G (green) component in the pixels of the face, and the lip position can be confirmed through the comparing B component of each pixel with G component of each pixel.

A confirming submodule 32, the confirming submodule 32 is used for confirming characters outputted by user according to a lip's shape of each frame valid image and a lip's shape of a previous frame valid image;

A reforming submodule 33, the reforming submodule 33 can be used for form the lip-reading recognition result based on the characters corresponding to each frame valid image;

It is to be understood by the ordinary skill in the art, the lip's shape of the previous frame image before the first frame image of the acquired images defaults to a shut up shape, the user can get a tendency of the lip based on the previous frame image and the lip's shape corresponding to the previous frame image, the tendency of the lip can be compared with the prestored tendency of the lip, to get the current outputted characters. According to the acquisition order of the frame images, the frame images form the lip-reading recognition result.

A processing module 40, the processing module 40 can be used for calculating accuracies of the voice signal recognition result and the lip-reading recognition result, and taking recognition result with a higher accuracy as a current voice recognition result.

Figure 10:
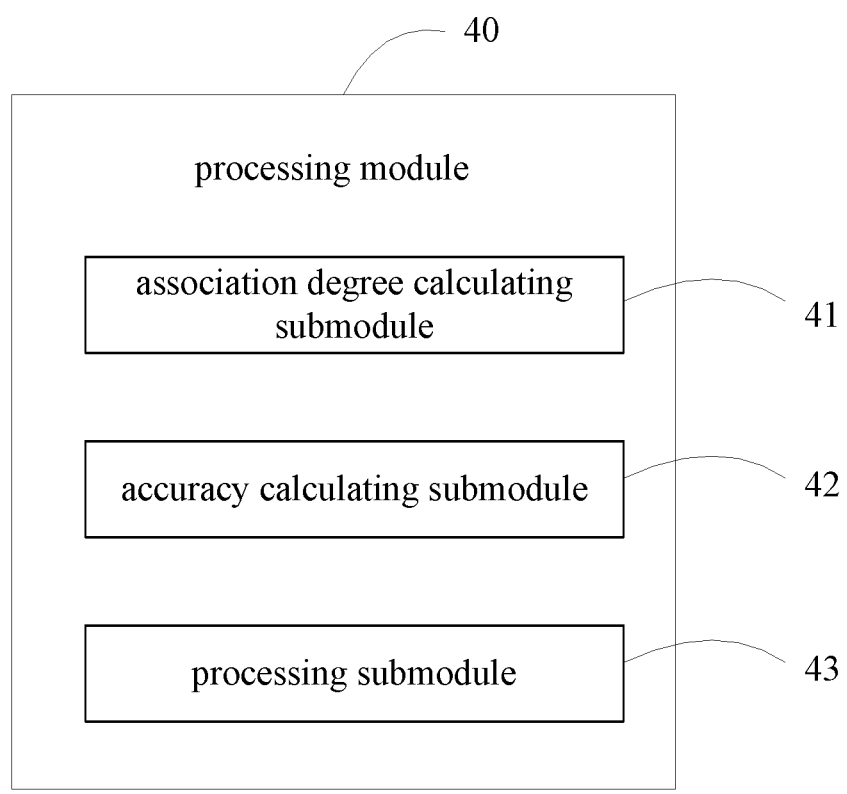
FIG. 10 is a refining function module diagram of processing module shown in FIG. 6.

In the exemplary embodiment, referring to FIG. 10, the processing module 40 includes:

A splitting submodule 41, the splitting submodule 41 can be used for splitting the voice signal recognition result and the lip-reading recognition result into a plurality of key words;

The process of splitting the key words is same with the splitting the key words of the voice signal, no need to repeat again.

An association degree calculating submodule 42, the association degree calculating submodule 42 can be used for confirming the first association degree of every two adjacent key words among the key words split from the voice signal recognition result, and confirming the second association degree of every two adjacent key words among the key words split from the lip-reading recognition result;

In the exemplary embodiment, a calculating formula of the first association degree can be:

$$I(x, y) = \frac{\log_2 p(x, y)}{p(x) \times p(y)},$$

p(x) can be a number of key word x appeared in the character string in two adjacent key words x, y, p(y) can be a number of key word y appeared in the character string in two adjacent key words x, y, p(x, y) can be a number of adjacent key words x, y appeared in the character string at the same time. A calculating formula of the second association degree is same with the calculating formula of the first association degree, no need to repeat again.

An association degree calculating submodule 43, the association degree calculating submodule 43 can be used for summing the confirmed first association degrees, to get the accuracy of the voice signal recognition result, and summing the confirmed second association degrees, to get the accuracy of the voice signal recognition result;

In the exemplary embodiment, the first association degree of every two adjacent key words in the character string is calculated to get a plurality of first association degrees, the calculated association degrees are summed to get the accuracy of the character string.

A processing submodule 44, the processing submodule can be used for taking the recognition result with a higher accuracy as the current voice recognition result.

The voice recognition system provided by the exemplary embodiment can recognize the voice signal and the lip-reading simultaneously, and the accuracies of the voice signal recognition result and the lip-reading recognition result, and the recognition result with a higher accuracy can be regarded as the current recognition result, and not just recognize the voice signal, such that the accuracy of the voice signal is improved.

It is to be noted that, in the specification, term "include", "has", or any other terms which mean to cover non-exclusive including, so that the process, method or system can not only include the elements, but also include other elements which are not listed clearly, or also include inherent elements of the process, method, product or system. In the absence of more restrictions, the element limited by a sentence "include a", does not exclude other same elements existed in the process, method, product or system including the element.

The serial numbers of the above exemplary embodiment of the present disclosure are only used for describing, not presenting the performances of the exemplary embodiments.

Through the describing of the exemplary embodiments, the ordinary skill in the art can clearly know that the exemplary embodiment method can be achieved by software and a necessary general hardware platform, of course, by hardware, however in most cases, the former is a better exemplary embodiment. Based on the understanding, the technical proposal of the present disclosure essentially, or parts contributing to the existing technology, can be presented through software product, the computer software product is stored in a storage medium (such as ROM/RAM, a diskette, a light disk), includes a plurality of instructions which can be used for making a terminal device (the terminal device can be a phone, a computer, a server, an air conditioner, or a network device, and so on) to execute the methods of the exemplary embodiments of the present disclosure.

What is claimed is:

1. A voice recognition method, comprising:
   when receiving a voice signal, controlling an image acquisition device to acquire images, and when the voice signal being over, controlling the image acquisition device to stop acquiring the images;
   recognizing the received voice signal to obtain a voice signal recognition result, by:
   converting the received voice signal into a character string, and splitting the character string into a plurality of key words based on a preset key words database, the ordering of the plurality of key words corresponding to the word order of the character string;
   marking a part of speech of each key word, and ascertaining whether the parts of speech of every two adjacent key words are matched;
   when the parts of speech of two adjacent key words are not matched, regarding the non-matching key word as a first key word and determining whether the first key word exists in a preset confusable words database, the non-matching key word referring to one of the two adjacent key words which has not been matched with an adjacent key word thereof;
   when there exists the non-matching key word in the preset confusable words database, determining a second key word in the preset confusable words database that corresponds to the first key word; and
   replacing the first key word with the second key word, and when the part of speech of the replacing second key word is matched with the parts of speech of the key words adjacent to the replacing second key word, recombining the replacing second key word and other key words to form the voice signal recognition result, and regarding the recombined voice signal recognition result as the current voice signal recognition result;
   recognizing a lip-reading of an image comprising a lip comprised in the acquired images to acquire a lip-reading recognition result; and
   calculating accuracies of the voice signal recognition result and the lip-reading recognition result, taking the recognition result with a higher accuracy as a current voice recognition result.

2. The voice recognition method according to claim 1, wherein recognizing the lip-reading of the image comprising the lip comprised in the acquired images to acquire the lip-reading recognition result comprises the following steps:
   the image comprising the lip comprised in the acquired images is confirmed, the image containing the lip is regarded as a valid image, and a position of the lip in the valid image is confirmed;
   characters outputted by a user is confirmed according to a lip's shape of each frame valid image and a lip's shape of a previous frame valid image; and
   the characters corresponding to each frame valid image form the lip-reading recognition result.

3. The voice recognition method according to claim 2, wherein confirming the acquired image having the lip comprised in the acquired image, regarding the image comprising the lip as the valid image, and confirming the position of the lip in the valid image comprise the following steps:
   a face contained in each acquired frame image is confirmed;
   a chromatic value of each pixel in the face is compared with a prestored chromatic value of each pixel in the face, to confirm a position of the face in each acquired frame image;
   eyes position in the face position is confirmed, and a lip area is confirmed based on a relative position between the eyes position and the face position;
   RGB chromatic values of each pixels in the lip area are compared;
   when one RGB chromatic value existed in the lip area meets a preset condition of the pixel, the frame image is confirmed as the image containing the lip, and the image containing the lip is regarded as the valid image; and
   the position of the lip is confirmed based on the RGB chromatic values in the lip area.

4. The voice recognition method according to claim 1, wherein recognizing the received voice signal to obtain the voice signal recognition result also comprises the following steps:

when the part of speech of the replacing second key word is not matched with adjacent key words and there is a plurality of the second key word, the first key words are replaced with the plurality of second key words, and whether the replacing second key words are matched with adjacent key words is confirmed, until all the second key words are replaced, the converted character string is regarded as the current voice recognition result.

5. The voice recognition method according to claim 1, wherein calculating accuracies of the voice signal recognition result and the lip-reading recognition result, taking the recognition result with a higher accuracy as a current voice recognition result comprises the following steps:

the voice signal recognition result and the lip-reading recognition result are split into a plurality of key words;
a first association degree of each two adjacent key words among the split key words according to the voice signal recognition result is confirmed, and a second association degree of each two adjacent key words among the split key words according to the lip-reading recognition result is confirmed;
the confirmed first association degree are summed to obtain the accuracy of the voice signal recognition result, and the confirmed second association degree are summed to obtain the accuracy of the voice signal recognition result;
the recognition result with a higher accuracy is regarded as the current voice recognition result.

6. A voice recognition system, comprising:
a control module, configured to control an image acquisition device to acquire images in response to receiving a voice signal, and control the image acquisition device to stop acquiring the images in response to the voice signal being over;
a voice signal recognition module, configured to recognize the received voice signal to obtain a voice signal recognition result, the voice signal recognition module comprising:
a converting submodule, configured to convert the received voice signal into a character string;
a splitting submodule, configured to split the character string into a plurality of key words based on a preset key words database, the ordering of the plurality of key words corresponding to the word order of the character string;
a part-of-speech matching submodule, configured to mark a part of speech of each key word, and ascertain whether the parts of speech of every two adjacent key words are matched;
a determining submodule, configured to, when the parts of speech of two adjacent key words are not matched, regard the non-matching key words as a first key word and determine whether the first key word exists in a preset confusable words database, the non-matching key word referring to one of the two adjacent key words which has not been matched with an adjacent key word thereof, and further determine a second key word in the preset confusable words database that corresponds to the first key word when the non-matching key word exist in the preset confusable words database; and
a processing submodule, configured to replace the first key word with the second key word, and when the part of speech of the replacing second key word is matched with the parts of speech of the key words adjacent to the replacing second key word, recombine the replacing second key word and other key words to form the voice signal recognition result, and regard the recombined voice signal recognition result as the current voice signal recognition result;
a lip-reading recognition module, configured to recognize an image comprising the lip comprised in the acquired image to obtain a lip-reading recognition result; and
a processing module, configured to calculate accuracies of the voice signal recognition result and the lip-reading recognition result, and take the recognition result with a higher accuracy as a current voice recognition result.

7. The voice recognition system according to claim 6, wherein the lip recognition module comprises:
a lip locating submodule, the lip locating submodule is used for confirming that the acquired images comprised the image comprising the lip, regarding the image comprising the lip as a valid image, and confirming a lip position comprised in the valid image;
a confirming submodule, the confirming submodule is used for confirming characters outputted by a user according to a lip's shape of each frame valid image and a lip's shape of a previous frame valid image; and
a reforming submodule, the reforming submodule is used for form the lip-reading recognition result based on the characters corresponding to each frame valid image.

8. The voice recognition system according to claim 7, wherein the lip locating submodule comprises:
a face confirming unit, the face confirming unit is used for confirming the face in the acquired each frame image;
a face position locating unit, the face position locating unit is used for comparing a chromatic value of each pixel in the face with a prestored chromatic value of each pixel in the face, to confirm a position of the face in each acquired frame image;
a lip area locating unit, the lip area locating unit is used for confirming eyes position in the face position, and confirming a lip area based on a relative position between the eyes position and the face position;
a comparing unit, the comparing unit is used for comparing RGB chromatic values in the lip area;
a processing unit, when one RGB chromatic value existed in the lip area meets a preset condition of the pixel, the processing unit is used for confirming that the frame image comprises the image having the lip, and the image having the lip is regarded as the valid image; and
a lip position locating unit, the lip position locating unit is used for confirming a position of the lip based on the RGB chromatic values in the lip area.

9. The voice recognition system according to claim 6, wherein the processing submodule is further configured to, when the part of speech of the replacing second key word is not matched with adjacent key words and there is a plurality of the second key word, replace the first key words with the plurality of second key words, and whether the replacing second key words are matched with adjacent key words is confirmed, until all the second key words are replaced, regard the converted character string as the current voice recognition result.

10. The voice recognition system according to claim 6, wherein the processing module comprises:
a splitting submodule, the splitting submodule is used for splitting the voice signal recognition result and the lip-reading recognition result into a plurality of key words;

an association degree calculating submodule, the association degree calculating submodule is used for confirming a first association degree of each two adjacent key words among the split key words according to the voice signal recognition result, and confirming a second association degree of each two adjacent key words among the split key words according to the lip-reading recognition result;

an accuracy calculating submodule, the accuracy calculating submodule is used for summing the confirmed first association degree to obtain the accuracy of the voice signal recognition result, and summing the confirmed second association degree to obtain the accuracy of the voice signal recognition result; and a processing submodule, the processing submodule is used for taking the recognition result with a higher accuracy as the current voice recognition result.

* * * * *